(12) United States Patent
Brooker et al.

(10) Patent No.: US 9,141,309 B1
(45) Date of Patent: Sep. 22, 2015

(54) VERSIONING-CAPABLE DATA STORAGE DEVICES

(75) Inventors: Marc J. Brooker, Seattle, WA (US);
David R. Richardson, Seattle, WA (US);
Madhuvanesh Parthasarathy, Renton, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 137 days.

(21) Appl. No.: 13/434,749

(22) Filed: Mar. 29, 2012

(51) Int. Cl.
*H04L 9/32* (2006.01)
*G06F 3/06* (2006.01)
*G06F 11/10* (2006.01)
*G06F 21/10* (2013.01)

(52) U.S. Cl.
CPC ............ *G06F 3/0689* (2013.01); *G06F 3/0629* (2013.01); *G06F 3/0679* (2013.01); *G06F 11/1076* (2013.01); *G06F 21/10* (2013.01)

(58) Field of Classification Search
CPC ................................ G06F 3/0689; G06F 21/10
USPC ............................ 711/161, 103, 162; 365/185
See application file for complete search history.

(56) References Cited

U.S. PATENT DOCUMENTS

| | | | | |
|---|---|---|---|---|
| 5,317,731 A | * | 5/1994 | Dias et al. ............................ | 1/1 |
| 2005/0162930 A1 | * | 7/2005 | Mukaida .................. | 365/185.33 |
| 2009/0249001 A1 | * | 10/2009 | Narayanan et al. ........... | 711/161 |
| 2010/0138620 A1 | * | 6/2010 | Jess ............................... | 711/162 |
| 2010/0169591 A1 | * | 7/2010 | Atluri et al. ................... | 711/162 |
| 2011/0238888 A1 | * | 9/2011 | Chiu et al. .................... | 711/103 |
| 2012/0239860 A1 | * | 9/2012 | Atkisson et al. .............. | 711/103 |

* cited by examiner

*Primary Examiner* — Aimee Li
*Assistant Examiner* — Trang Ta
(74) *Attorney, Agent, or Firm* — Kilpatrick Townsend & Stockton LLP

(57) ABSTRACT

A data storage device is modified or adapted to support the storage and retrieval of versioned data sets. In some embodiments, the modified or adapted data storage device is capable of writing and tracking multiple data sets per logical location, and is capable of retrieving a specific versioned data set upon receiving a read request for that version of the data set.

25 Claims, 5 Drawing Sheets

VERSIONING-CAPABLE DATA STORAGE DEVICES

BACKGROUND

Modern data storage devices have grown in complexity and capacity over time. Increasingly, data storage devices rely on complex mappings to represent data to users of the devices, and some modern data storage devices retain multiple versions of data written to the drive in an effort to defer computationally and practically disadvantageous writes and erasures of the physical drive media. Such drives typically do not allow external access to the older versions of the data, and the expense and time required to implement versioning and/or snapshotting capabilities can be substantial.

BRIEF DESCRIPTION OF THE DRAWINGS

Various embodiments in accordance with the present disclosure will be described with reference to the drawings, in which.

DETAILED DESCRIPTION

Figure 1:
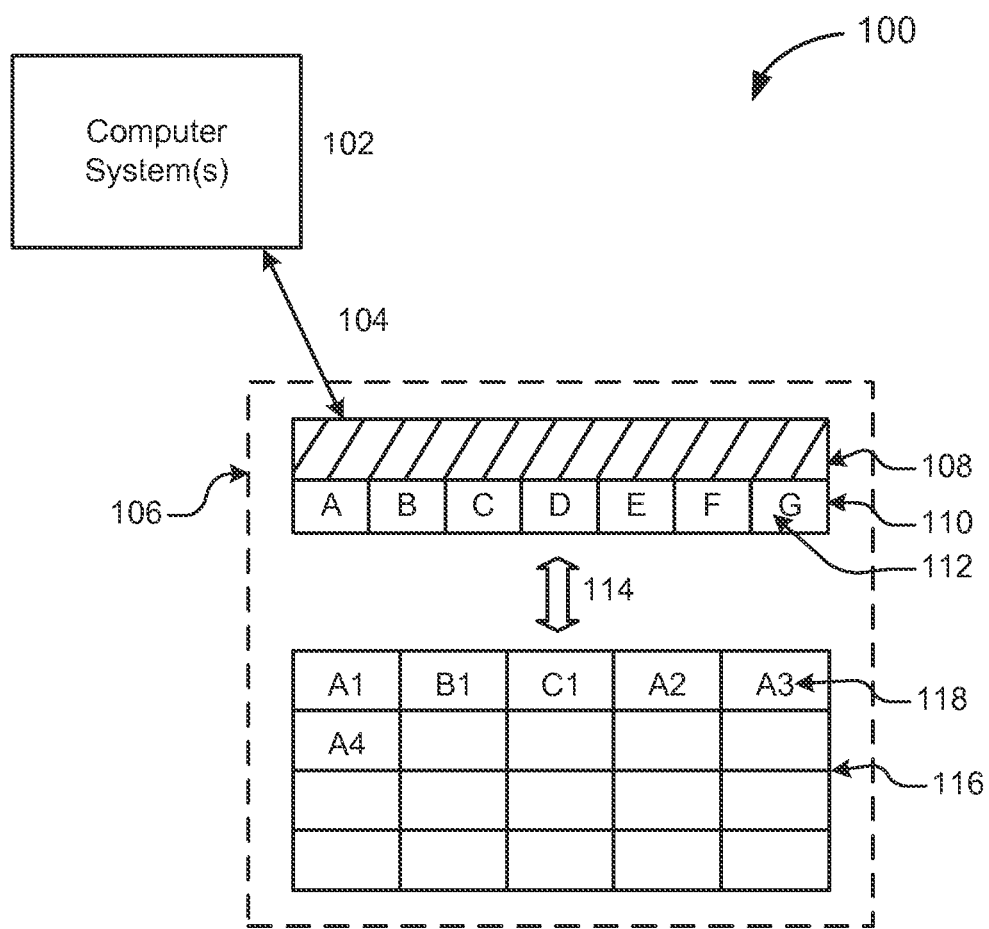
FIG. 1 illustrates an example of a configuration corresponding to some embodiments.

Systems and methods in accordance with various embodiments of the present disclosure may overcome one or more of the aforementioned and other deficiencies experienced in conventional approaches to providing access to data in an electronic environment. In particular, various embodiments provide access to versions and/or snapshots of data by adapting, modifying or implementing one or more data storage devices to retain the data versions and/or snapshots. For example, a user and/or system may, by updating a firmware resident on a data storage device that already retains, when writing data to a logical address of the data storage device, at least some of the data sets previously written to that logical address, enable the data storage device to user and/or system provide access to those previously written data sets. Data sets may include any appropriate unit or units of data, including blocks, extents, files, offset ranges, and the like. A user may, in some embodiments, be an operator of the data storage device, and/or an operator of a system to which the data storage device is connected. In some embodiments, the system itself manipulates the data storage device according to determined needs for the data storage device. Systems include, but are not limited to, one or more computer resources, dedicated hardware for updating data storage devices (such as flash writers), or any other entity or entities to which a data storage device would appropriately be connected. Data storage devices include one or more systems or any aspects thereof that are capable of storing data. Such devices may be hardware-based, virtualized across one or more storage entities, or otherwise implemented in any other appropriate manner. Such devices may include, for example, block storage devices.

In some embodiments, after the data storage device has been updated and/or adapted in accordance with the examples previously given, the data storage device stores and/or maintains at least a version tracker and a location table for data stored to each logical address of the device. Additionally, in some embodiments, the device stores data in a manner that retains at least one previous data set written to the logical address. The version tracker and the location table are, in some embodiments, stored in the firmware resident on the device, although either or both components may, alternatively or in addition, be implemented on a system external to the device. In some embodiments, upon each write request to a given logical address, the version tracker is updated to indicate a new version of the data stored at the logical address. In some embodiments, the version tracker also associates version identifiers with each set of data written to the logical address, thus creating versioned data sets. Additionally, in some embodiments, the location table tracks the location on the device of each versioned data set. It is contemplated the creation of new versioned sets of data may be automatically performed by the device, controlled by the system and/or the data requestor, or configurable between automatic and manual control.

In some embodiments, the updated storage device is operable to respond to read requests for versioned data sets. Requests to read data on the device may include version identifiers, data location upon the device, neither or both. In some embodiments, data associated with version identifiers and/or device data locations are returned in accordance with the read request. In some embodiments, if a read request only asks for data at a logical address, the device returns the most recent version of the data written to that logical address.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

FIG. 1 illustrates an example of environment 100 for implementing aspects in accordance with various embodiments. In this example, one or more computer systems 102 connects, via data connection 104, to a data storage device 106 at least to modify, adapt, or otherwise connect to the device. The one or more computer systems may be standalone computer resources, one or more networked computer resources, components thereof, or any computer resource capable of connecting with the data storage device. As noted above, it is contemplated that the connecting entity need not necessarily be a computer system, but instead may be a standalone device, with or without the benefit of a user of said device, capable of interfacing with the data storage device. Examples include, but are not limited to, flash writing devices and bench flashing devices. The standalone device may be operated by a human user, a computer system, or a combination thereof. The data connection between the device and the, e.g., one or more computer systems may be of any appropriate type, including wired networks, direct cabling over a data bus, or wireless connections. The connectivity over the data connection may conform to a standard, future or currently existing, appropriate for connecting data storage devices to computer systems, including but not limited to variants of SCSI such as Serial Attached SCSI (SAS), Serial ATA (SATA), and Fibre Channel. In some embodiments, the data storage device may comprise a subset of the resources of the connecting computer system(s). In some embodiments, the data storage device is implemented as a virtual device using the subset of resources of the computer system(s).

In this example, the data storage device 106 consists of a controller 108 and data storage media 116, the controller and the data storage media communicating through a data link 114. It will be appreciated that in other embodiments, the data storage device may lack a controller, or may have additional components, such as host interfaces, caches and/or multiple controllers. In some embodiments, the data storage device is a commodity and/or commercially available data storage device, including but not limited to a solid state storage device (SSD) or an electromechanical hard disk drive. In some embodiments, the controller comprises one or more processors and/or memory, wherein the processor(s) are capable of executing instructions, e.g., from the firmware. In some embodiments, the data storage device is a subset of resources of the one or more computer systems, such as a virtualized storage device or volume, a virtual block storage device, or other computer system-implemented data store. In the example given, the data storage device functions at least in part by implementing, within the controller, firmware 108 that at least in part implements a data map 110. In some embodiments, the firmware is stored upon a non-volatile, readable and writable memory connected to or integral with the controller. However, as previously mentioned, it is contemplated that other manifestations of the firmware, or functionality approximated therein, may be implemented outside of the controller or outside of the data storage device itself, such as upon the one or more computer systems (as would be the case if the data storage device itself was controllerless, e.g., a flash memory device such as a Secure Digital card, or if the data storage device was a virtualized device or volume implemented by the one or more computer systems). In some embodiments, the data map correlates externally accessible logical data locations 112, denoted in the example as locations A through G, with one or more physical data locations 118, represented in part by locations A1, B1, C1, A2, A3, and A4, upon the data storage media. The logical data locations may be identified in any appropriate manner, including but not limited to byte offsets, sector numbers such as used in logical block addressing (LBA) notation, or physical or virtual locations in cylinder/head/sector (CHS) notation. In a preferred embodiment, the data storage device retains data previously written to a logical location even after receiving another data write to that logical location. Such preferred embodiments may, for example, include such characteristics by incorporating commercially available SSDs, as well as electromechanical hard disk drives utilizing shingled write recording (SWR).

In the example given, logical data location A has a first set of data written to it and stored at and mapped, using the data map, to physical data location A1. Logical locations B and C have data sets written to them at physical locations B1 and C1, respectively. When a second set of data is written to A, the data storage drive in the preferred embodiment writes to physical location A2 rather than overwrite the data at physical location A1. Instead, the data map is updated to point logical data location A to physical location A2. A similar process occurs for third and fourth data writes to A; data is written to physical data locations A3 and A4, respectively, and the data map is updated to reflect the most recent write. Accordingly, in some embodiments, read requests to the data storage drive are directed, using the data map, to the most recently written data for a given logical data location. In the given example, a data read request to logical data location A would return the data at physical data location A4, rather than A1-A3. In some embodiments, the previously written physical data locations, e.g., A1 through A3 in this example, are marked as available for writing new data, e.g., via an ATA TRIM command from the one or more computer systems. In some embodiments, such marked physical data locations are not actually overwritten or erased until there are insufficient previously unwritten physical locations to commit a new data set. In some embodiments, such marked locations are noted in the data map. It is appreciated that, in some embodiments, the data map has more functionality than described herein, but such additional functionality is omitted in the example given for clarity of understanding.

Figure 2:
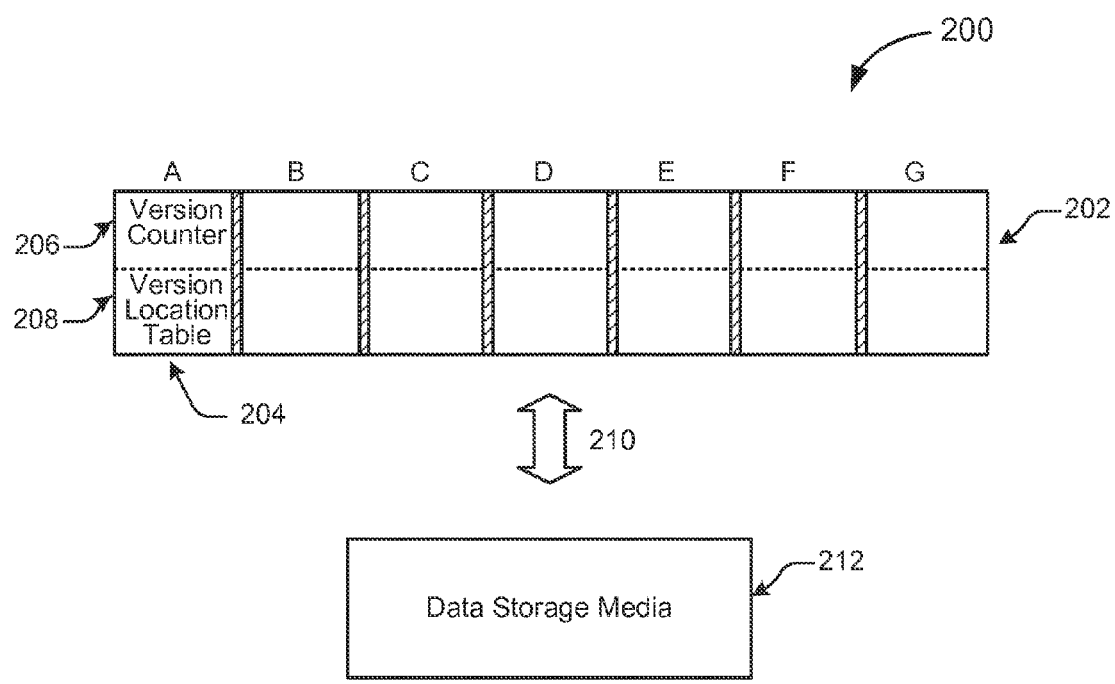
FIG. 2 illustrates an example of a data versioning table implemented by some embodiments.

In some embodiments, the firmware, or functionality approximated therein but implemented in some other appropriate form as previously described, is replaced, extended or modified to enable versioning ability by preserving and configuring access to versioned data stored among the physical locations of the data storage media. FIG. 2 diagrammatically illustrates a data versioning table 200 implemented to enable versioning ability in a data storage device in accordance with some embodiments. In some embodiments, the data map 202, which in some embodiments derives from the data map 110 as described in connection with FIG. 1, is modified or implemented to include, for each logical data location 204 (denoted as A through G), a version counter 206 and a version location table 208. In some embodiments, each logical data location 204 maps to one or more locations upon data storage media 212 in a fashion similar to that described in connection with the data storage media 116 of FIG. 1. The version counter is, in some embodiments, incremented upon each data write to the associated logical data location. In some embodiments, the version counter creates, and in some embodiments externally indicates, a version identifier of the data most recently written to the logical data location. In some embodiments, each version identifier for data written to the logical data location is associated, within the version location table, with one or more physical locations upon the data storage media. Thus, the version location table is, in some embodiments, capable of tracking the physical location of multiple versions of the data written to the logical data location. In some embodiments, the version counter, the version location table or both are implemented in an entity other than the data map. The implementing entity may be a controller and/or the firmware of a data storage device, the data storage media itself, or some aspect of a connected computer system(s). In some embodiments, as part of enabling versioned data support, data existing on the data storage device prior to enabling the versioning functionality is processed such that the data at each logical data location of the device is assigned an initial version identifier, and is mapped to their existing physical data locations in the version location table. Such a technique would be advantageous for enabling the versioning functionality without requiring data to be removed beforehand, and rewritten to the device after the enabling. In some embodiments, native garbage collection, including but not limited to de-duplication functionality, is disabled to facilitate the implementation of versioning capability upon the device. In some embodiments, if data written to logical data locations is compressed by the unmodified controller, firmware or other entity when written to the corresponding physical data locations, the versioning-enabled firmware may, in some cases, contain similar compression/de-compression routines. Some embodiments implement compression or other data-altering techniques in versioning-enabled firmware where the original firmware or controller did not natively employ such techniques, e.g., in order to increase versioning capabilities, performance, availability, reliability or other applicable attributes. Some embodiments implement compression techniques that only write, to physical data locations, data that has been modified relative to at least one of the other data sets or blocks associated with the written logical data location (e.g., incremental backups). In some embodiments, the device's firmware and/or controller are left unmodified, but measures are taken by an external entity, e.g., as implemented by the connected computer system(s) to bypass or otherwise adapt the existing firmware such that the versioning capability is enabled.

Figure 3:
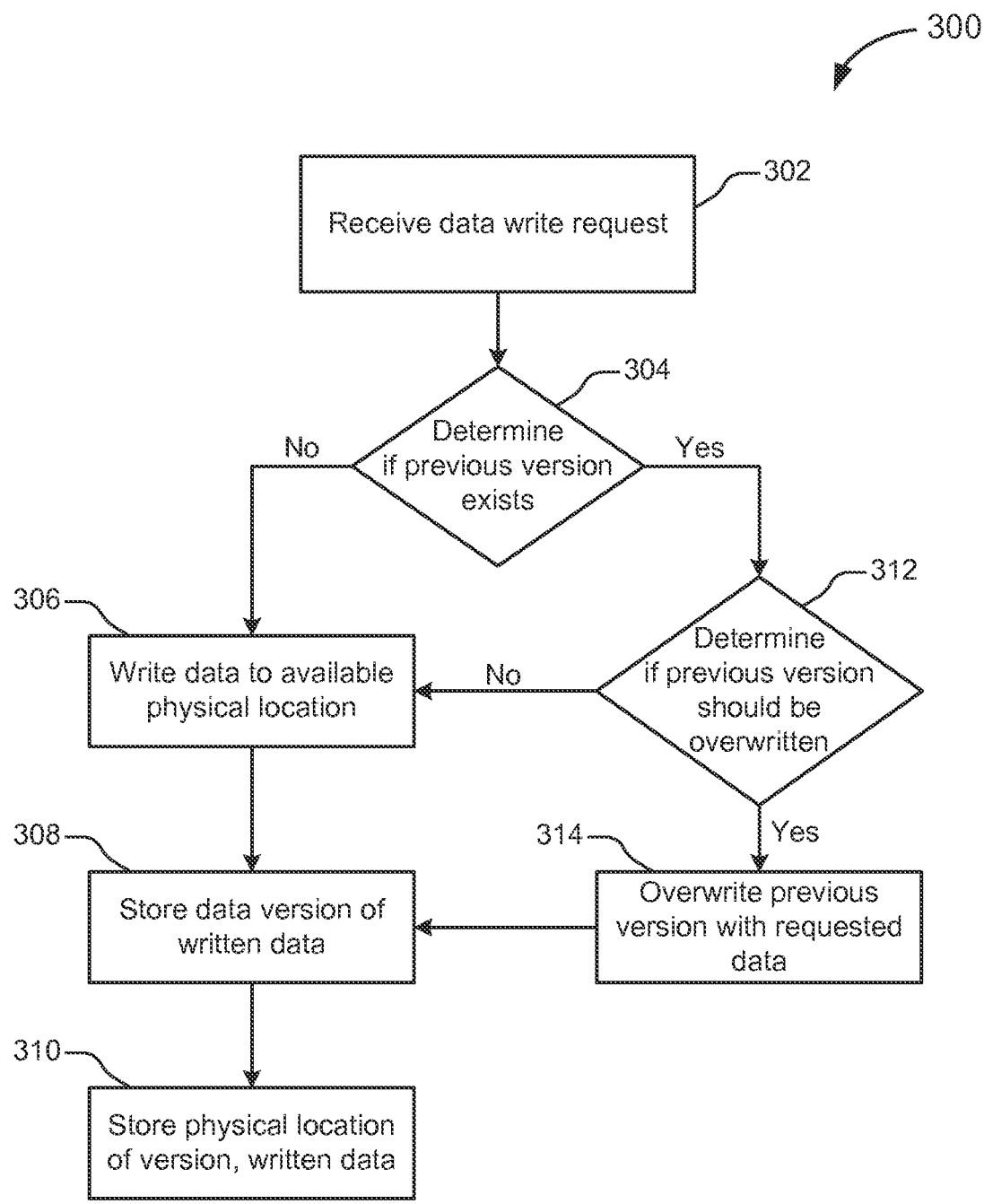
FIG. 3 illustrates an example process for processing data write requests in accordance with some embodiments.

After enabling the versioning functionality as described above in connection with FIG. 2, the drive is capable of storing and retrieving versioned data sets for each logical data location thereon. FIG. 3 illustrates an example process 300 for responding, by a versioning-enabled data storage device, to data write requests. Such requests may be received 302 from a connected computer system(s) or components thereof, and by an appropriate entity, such as a component of the data storage device, including but not limited to the controller or host interface as described in connection with FIG. 1. Additionally, in some embodiments, the data write request may be received and processed by the connected computer system(s). The data write request includes the data and, in some embodiments, the logical location to which the data is intended to be written. In some embodiments, the logical location to which the data will be written is determined by the data storage device, e.g., by the controller or the firmware. In some embodiments, the data write request may include other instructions, including instructions to overwrite or render inaccessible one or more previous versions of data stored at the logical location. Upon receiving the request, the data storage device optionally determines if the written logical data location has previously associated data sets 304. If such data sets do not exist or, in some embodiments, have no version identifiers or other versioning information associated with them, the data associated with the request is written to an available physical location 306, as determined in some embodiments by the controller 108, an implemented firmware, or the data map 110, 202 as described in connection with FIGS. 1 and 2. As may be appreciated, such available physical locations, may be clear physical data locations on the storage media, or in some embodiments, occupied physical data locations marked as available in the data map as described in connection with FIG. 1. Upon writing the data to the physical location, the version counter assigns and stores a new version identifier(s) associated with the written data 308, and the physical location(s) or version location identifier(s) of the written data are stored in the version location table 310. The functionality of the version counter and the version location table are similar, in some embodiments, to that described in connection with FIG. 2.

If determined at optional step 304 that previously written and/or versioned data exists for the logical data location to which the data is intended to be written, it is additionally, optionally determined whether the previously written data should be overwritten 312. As described above, such a determination may be informed by an instruction in the data write request to overwrite previously written data set(s) corresponding with the logical data location. In some embodiments, the device may be configured or instructed to only retain a fixed number of versioned data sets per logical data location, e.g., in the interest of space or simplicity, and the determination to overwrite may be made based on whether that fixed threshold number has been met or exceeded. In some embodiments, the device may be configured to begin overwriting old or stale data sets when, e.g., the device is full or reaches a certain capacity, and in some embodiments, may determine that the oldest version of data at a given logical data location should be overwritten when such conditions have been met. In some embodiments, the device may be configured to overwrite data sets if such data sets (or the associated logical data location) have been infrequently accessed. In some embodiments, a device may be configured to determine which data sets to overwrite based on a client's usage of such data sets and/or associated logical data locations, such as by a determination based on frequency of access, client access patterns, and the like. If determined that one or more previous versions should be overwritten 312, such previous versions are overwritten with the requested data 314, and a new data version identifier 308 and version location table entry 310 is stored and associated in accordance with the techniques described above. However, if it is determined that previous versions should not be overwritten 312, the data is written to an available physical location 306 and a new data version identifier 308 and version location table entry 310 are stored and associated in accordance with the techniques described above. As will be appreciated, such a process is exemplary and not limiting.

Figure 4:
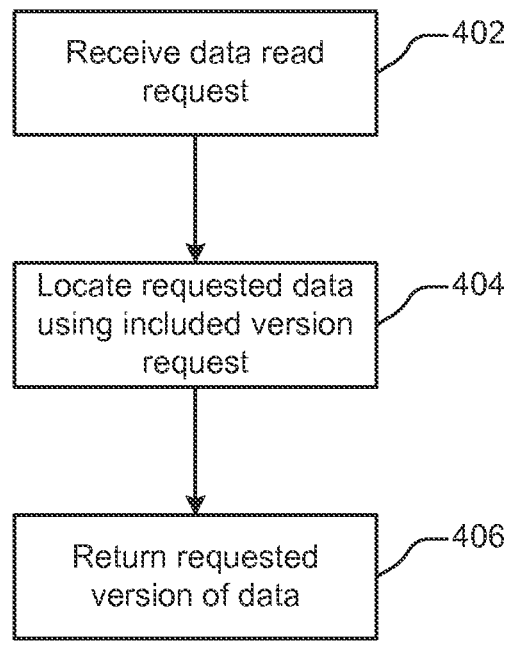
FIG. 4 illustrates an example process for processing data read requests in accordance with some embodiments.

FIG. 4 illustrates an example process 400 for responding, by a versioning-enabled data storage device, to data read requests. A data read request is received 402 from, for example, connected computer system(s) or associated entities. In some embodiments, the data read request includes a version identifier for the desired data. In some embodiments, the data read request includes a logical location of the desired data. At step 404, the data requested is located, e.g., by using a data map configured to locate stored data correlated with the logical location specified in the read request, as discussed in connections with FIGS. 1 and 2. In some embodiments, version location data associated with the desired logical location and version identifier are retrieved from a version location table, similarly to that described in connection with FIGS. 2 and 3, and used to locate the associated data. For example, the data read request may include an offset or similar logical location, as well as a desired version, whereupon the desired version of the data at the requested offset is located. Upon locating the requested data, the requested data is returned to the requesting entity 406. Such data may, in some embodiments, include data or metadata about the logical location (e.g., offset) and/or the version identifier associated with the returned data, e.g., to serve as an acknowledgement to the requestor that the data request was received and correctly interpreted. Depending on the particular embodiment, it is contemplated that additional steps, such as decompression of located data prior to returning the data to the requestor, e.g., when such data is compressed prior to physical storage as discussed in connection with at least FIGS. 2 and 3, may be included in process 400.

Figure 5:
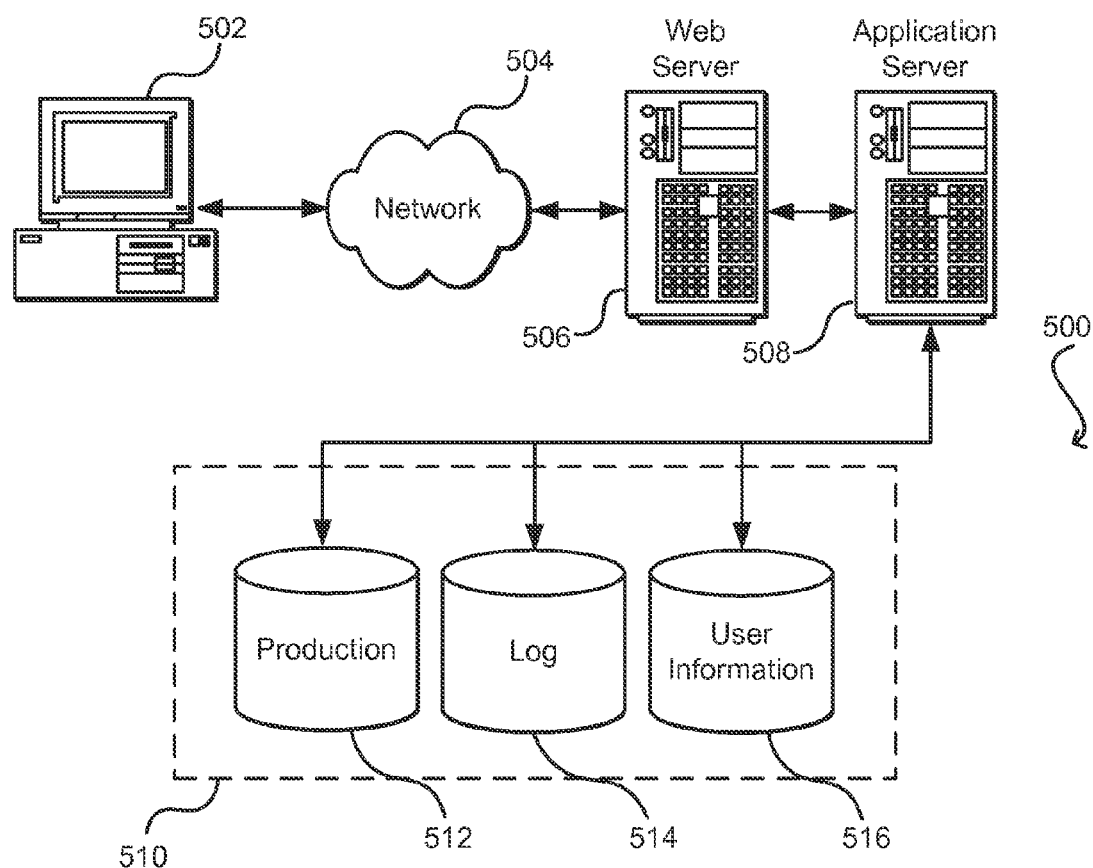
FIG. 5 illustrates an environment in which various embodiments can be implemented.

FIG. 5 illustrates an example of an environment 500 for implementing aspects in accordance with various embodiments. As will be appreciated, although a Web-based environment is used for purposes of explanation, different environments may be used, as appropriate, to implement various embodiments. The environment includes an electronic client device 502, which can include any appropriate device operable to send and receive requests, messages, or information over an appropriate network 504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 506 for receiving requests and serving content in response thereto, although for other networks an alternative device serving a similar purpose could be used as would be apparent to one of ordinary skill in the art.

The illustrative environment includes at least one application server 508 and a data store 510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 502 and the application server 508, can be handled by the Web server. It should be understood that the Web and application servers are not required and are merely example components, as structured code discussed herein can be executed on any appropriate device or host machine as discussed elsewhere herein.

The data store 510 can include several separate data tables, databases, or other data storage mechanisms and media for storing data relating to a particular aspect. For example, the data store illustrated includes mechanisms for storing production data 512 and user information 516, which can be used to serve content for the production side. The data store also is shown to include a mechanism for storing log data 514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 510. The data store 510 is operable, through logic associated therewith, to receive instructions from the application server 508 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out various embodiments. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for controlling data storage devices, comprising:
　selecting a plurality of solid state data storage devices of a datacenter, each of the plurality of solid state data storage devices configured to perform operations comprising:
　　storing data in a data storage media, the data storage media having a plurality of physical data locations on which to store the data, the solid state storage device comprising the data storage media; and
　　maintaining by a controller a data map that maps logical data locations to at least a subset of the plurality of physical data locations, the solid state storage device comprising the controller;
　　responding by the controller to data write requests to the logical data locations by:
　　　writing data associated with the data write requests to at least one physical data location within the subset of the plurality of physical data locations; and
　　　updating the data map to associate the written data with the written at least one physical data location; and
　　responding by the controller to data read requests to the logical data locations by retrieving data associated with the data read requests, using at least the data map, from associated mapped physical data locations; and
modifying the selected plurality of solid state data storage devices to be capable of creating a plurality of versions of a given data set by at least, for each of the plurality of solid state storage devices, adapting the corresponding controller by updating a firmware of the solid state device to further:
maintain version information for a logical data location, the version information maintained locally on the solid state data storage device by the corresponding controller and including at least:
a first version identifier for a first set of data written to the logical data location and stored in a first physical data location of the corresponding data storage media; and
a first version location identifier, corresponding with the first version identifier, that identifies the first physical data location associated with the first set of data;
respond to a data write request to the logical data location by at least:
storing a second set of data associated with the data write request in a second physical data location of the corresponding data storage media among the corresponding plurality of physical data locations such that the first set of data is preserved in the first physical data location;
storing a second version identifier for each data write request to the associated logical data location, the second version identifier stored locally in the version information in addition to the first version identifier to the logical data location; and
storing a second version location identifier, corresponding with the second version identifier, that identifies the second physical data location storing the second set of data, the second version location identifier stored locally in the version information in addition to the first version location identifier corresponding with the first version identifier; and
respond to a data read request to the logical data location with data from the first physical data location if the data read request includes the first version identifier or with data from the second physical data location if the data read request includes the second version identifier.

2. The computer-implemented method of claim 1, wherein the first version identifier, the second version identifier, the first version location identifier, and the second version location identifier are stored in the data map.

3. A computer-implemented method for controlling data storage devices, comprising:
for each data storage device of a plurality of solid state storage devices of a datacenter:
maintaining version information for a logical data location on a data storage device, the version information maintained locally on the data storage device by a controller that is implemented in firmware of the data storage device to directly map logical data locations to physical data locations of the data storage device, the version information including at least:
a first version identifier for a first block of data written to the logical data location; and
a first version location identifier that corresponds to the first version identifier and that identifies, on the data storage device, a first physical data location associated with the block of data;
responding to a data write request to the logical data location by at least:
storing a second block of data associated with the data write request to a second physical data location on the data storage device such that the first block of data is preserved at the first physical data location on the data storage device;
storing a second version identifier for the data write request to the logical data location, the second version identifier stored locally in the version information in addition to the first version identifier to the logical data location; and
storing a second version location identifier that corresponds to the second version identifier and that identifies the second physical data location, the second version location identifier stored locally in the version information in addition to the first version location identifier; and
responding to a data read request to the logical data location with from the first physical location if the data read request includes the first version identifier or with data from the second physical location if the data read request includes the second version identifier.

4. The computer-implemented method of claim 3, wherein:
the data storage device is adapted to at least:
maintain the version information;
respond to the data write request; and
respond to the data read request; and
the data storage device is not inherently capable of creating a plurality of versions of a given block of data.

5. The computer-implemented method of claim 4, wherein the data storage device comprises at least:
data storage media that is configurable to store data, the data storage media having a plurality of physical data locations on which to store the data; and
a controller that at least:
maintains a data map that maps logical data locations to at least a subset of the plurality of physical data locations;
responds to data write requests to the logical data locations by:
writing data associated with the data write requests to at least one physical data location within the subset of the plurality of physical data locations; and
updating the data map to associate the written data with the written at least one physical data location; and
responds to data read requests to the logical data locations by retrieving data associated with the data read requests, using at least the data map, from associated mapped physical data locations.

6. The computer-implemented method of claim 4, wherein the data storage device is a virtualized volume comprising a subset of resources of the one or more computer systems.

7. The computer-implemented method of claim 4, wherein the data storage device is adapted by implementing, using at least a subset of the one or more computer systems, an entity that is capable of:
maintaining the version information;
responding to the data write request; and
responding to the data read request.

8. The computer-implemented method of claim 4, wherein the data storage device is adapted by at least one of modifying or replacing the firmware on the data storage device.

9. The computer-implemented method of claim 3, wherein the version information is maintained in a local table of the data storage device.

10. The computer-implemented method of claim 3, wherein the first version identifier, the first version location identifier, the second version identifier, and the second version location identifier are maintained in a same data map by the controller.

11. The computer-implemented method of claim 3, wherein responding to a data write request further comprises:
   determining a frequency of read requests associated with the second physical data location;
   selecting the second physical data location from the physical locations based at least in part on the frequency of read requests relative to a frequency of read requests to the first physical data location; and
   deleting existing data from the second physical data location based at least in part on the selecting.

12. The computer-implemented method of claim 3, wherein responding to a data read request further comprises:
   responding with metadata about the logical data location, the metadata indicating that the data properly corresponds to a requested version identifier.

13. A data storage system, comprising:
   a plurality of solid state storage devices of a datacenter, wherein each storage device of the plurality of solid state storage devices comprises a controller implemented within firmware of the storage device, the controller configured to at least:
      internally to the storage device create a plurality of versions of a given data set by at least maintaining version information locally on the storage device, the version information comprising revision information and physical location information;
      in response to write requests to write a data set to a given logical data location among a plurality of logical data locations on the storage device:
         store the data set at a physical location of the storage device such that at least one data set previously associated to the logical data location is locally retained by the storage device at a previous physical location of the storage device;
         record revision information locally on the storage device for the stored data set to create a versioned data set, the revision information recorded in addition to previous revision information associated with the given logical data location and locally recorded on the storage device; and
         record physical location information locally on the storage device for the versioned data set, the physical location information recorded in addition to previous physical location information associated with the given logical data location and locally recorded on the storage device; and
      in response to read requests for a data set associated with the given logical data location, the read requests including at least the revision information associated with the requested data set, provide data from the physical location or from the previous physical location based at least in part on the revision information.

14. The data storage system of claim 13, wherein the controller is further configured to at least:
   record the revision information for data sets, existing on the storage device, that lack the revision information; and
   record the physical location information for data sets, existing on the storage device, that lack the physical location information.

15. The data storage system of claim 13, wherein implementing the controller in the firmware comprises updating or replacing the firmware of the storage device to enable the storage device to internally create the plurality of data set versions.

16. The data storage system of claim 13, wherein the controller is further configured to at least compress data written to physical locations of the storage device, the data being compressed relative to the data written to corresponding logical locations.

17. The data storage system of claim 16, wherein the controller is further configured to at least:
   internally create the plurality of versions of a given data set, such that the storage device at least:
      in response to write requests to write the data set to the given logical data location, compresses, relative to the data set requested to be written, the stored data set written to the physical locations;
      and in response to read requests for the data set associated with the given logical data location, decompresses the versioned data set prior to providing the versioned data set.

18. The data storage system of claim 13, wherein the controller is further configured to at least compress data written to the given logical data location, the data being compressed relative to at least one other data set written to the given logical data location.

19. One or more non-transitory computer-readable storage media having collectively stored thereon executable instructions that, when executed as part of a controller implemented locally within firmware of a storage device of a plurality of solid state storage devices associated with a datacenter, cause the storage device to at least:
   implement locally, by the controller within the firmware of the storage device, a versioning counter for each of a plurality of logical data locations on the storage device;
   upon receiving a data write command for a logical data location:
      store a data set associated with the data write command at a physical location of the storage device such that at least one data set previously written to the logical data location is preserved at a previous physical location of the storage device;
      upon storing the data set, increment the corresponding versioning counter for the logical data location to generate a data set version; and
      associate version location data that enables the storage device to locate the stored data set associated with the data set version, the version location data and the data set version locally associated on the storage device; and
   upon receiving a data read command for the logical data location, the data read command including a requested data set version, respond, by at least using the associated version location data to locate the stored data set from the physical location or the previous physical location, with stored data set associated with the requested data set version.

20. The one or more non-transitory computer-readable storage media of claim 19, wherein the executable instructions further cause the storage device to at least disable a garbage collection mechanism implemented by the storage device.

21. The one or more non-transitory computer-readable storage media of claim 19, wherein the executable instructions further cause the storage device to at least, upon receiving a data write command for a logical data location, overwrite an oldest data set associated with the logical data location, as indicated by the associated data set version.

22. The one or more non-transitory computer-readable storage media of claim 21, wherein the oldest data set is overwritten when the storage device has insufficient capacity to otherwise store the data set associated with the write command.

23. The one or more non-transitory computer-readable storage media of claim 19, wherein the executable instructions further cause the storage device to at least, upon receiving a data write command for a logical data location, overwrite an infrequently accessed data set associated with the logical data location.

24. The one or more non-transitory computer-readable storage media of claim 19, wherein the executable instructions further cause the storage device to at least, upon receiving a data write command for a logical data location, overwrite, based at least on client usage of the stored data sets associated with the logical data location, a data set associated with the logical data location.

25. The one or more non-transitory computer-readable storage media of claim 19, wherein the executable instructions further cause the storage device to at least modify or replace the firmware of the data storage system to implement at least the versioning counter.

\* \* \* \* \*